UNITED STATES PATENT OFFICE.

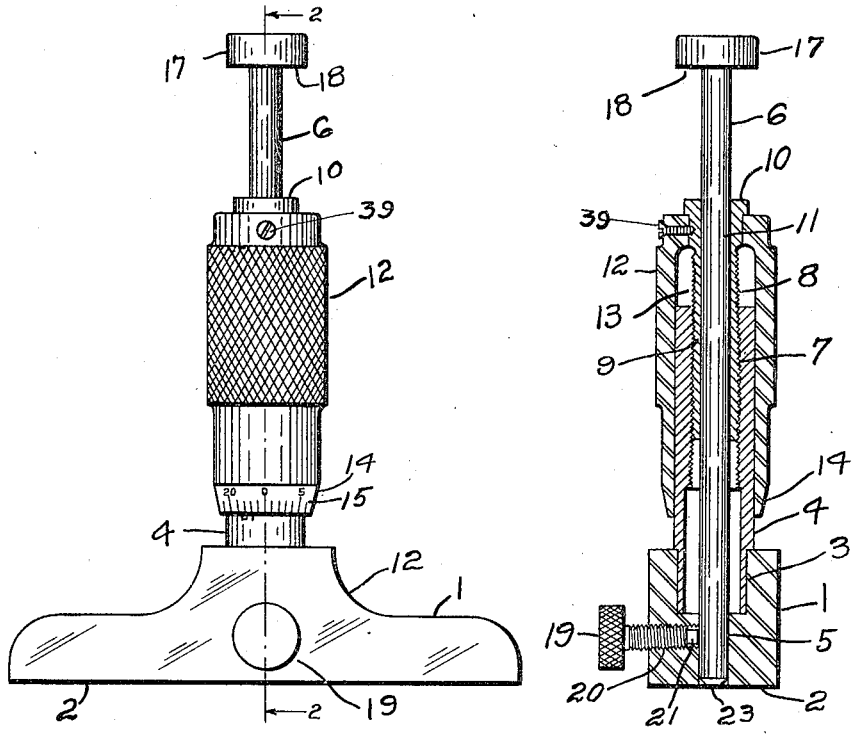
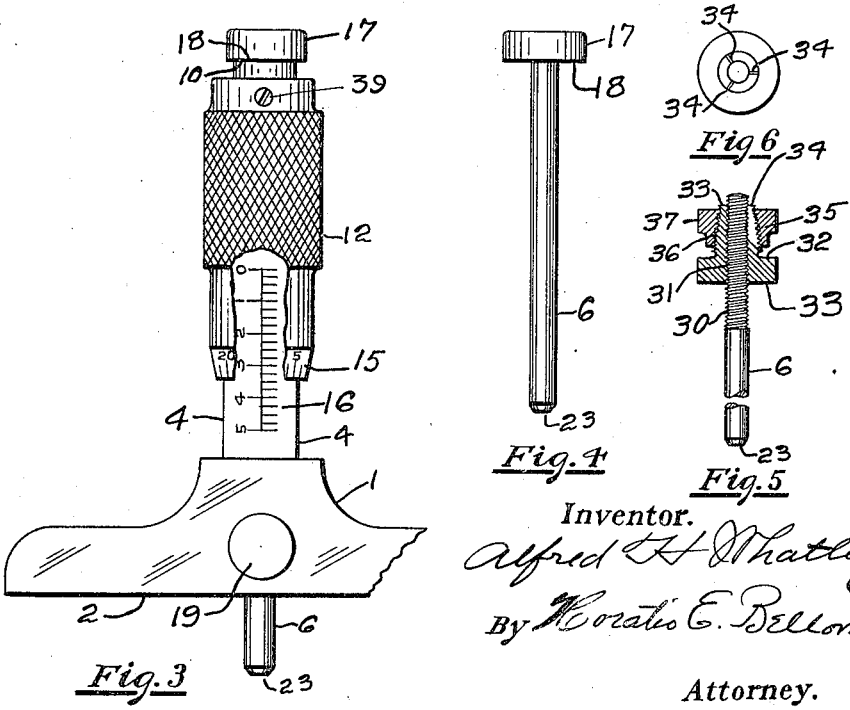

ALFRED H. WHATLEY, OF PROVIDENCE, RHODE ISLAND.

MICROMETRIC GAGE.

1,317,746.     Specification of Letters Patent.     Patented Oct. 7, 1919.

Application filed April 4, 1919. Serial No. 287,416.

*To all whom it may concern:*

Be it known that I, ALFRED H. WHATLEY, a citizen of the United States, residing at Providence, in the county of Providence and State of Rhode Island, have invented certain new and useful Improvements in Micrometric Gages, of which the following is a specification.

My invention relates to gages adapted for micrometric use.

The essential objects of my invention are to afford measurements of depth of holes, the length and width of articles from shoulder to shoulder, and the distance from an edge to a given point; to determine all measurements micrometrically; to insure accuracy and speed of measurement; to facilitate the readings; to avoid the errors of measurement incident to present structures due to rods advanced by threads; and to attain these and other advantages in a simple and inexpensive structure.

To the above ends my invention consists in such parts and in such combinations of parts as fall within the scope of the appended claims.

In the accompanying drawings which form a part of the specification,

Figure 1 is a front elevation of a depth gage embodying my invention,

Fig. 2, a section on line 2—2 of Fig. 1,

Fig. 3, a front elevation of the same with the parts in reading and measuring position, and with portions broken away, Fig. 4, a detail view of the measuring rod, Fig. 5, is a fragmentary elevation, partially in vertical section, of a modified form of rod, and Fig. 6, a plan view of the same.

Like reference numerals indicate like parts throughout the views.

In the present embodiment of my device is an oblong base 1 provided with a flat measuring face 2 upon its under portion and having a central opening 3 in which is frictionally seated a barrel 4. The opening 3 has a retracted portion 5 extending to the measuring face 2 in which portion slides a grooveless measuring rod 6. The barrel has an internal thread 7 engaging a thread 8 upon a tube 9 in which the rod 6 is slidable. The upper end of the sleeve has a ground measuring face 10. Integral with or fast to the sleeve 9 is a thimble 12 slidably embracing the barrel 4 and forming with the tube 9 an annular space or chamber 13 for the reception of the upper portion of the barrel 4. The lower end of the thimble has a beveled face 14 provided with graduations 15, twenty-five in number. This scale registers with a vertical scale of graduations 16 upon the barrel of hub, which graduations are twenty in number and extend along the barrel for one half an inch, being divided into 5 equal parts marked from 0 to 5 consecutively. The pitch of the screw threads is forty to the inch, and a single rotation of the sleeve 12 advances the same the distance of a fortieth of an inch, so that each of the graduations 15 measures one thousandth of an inch. This scale is the regular commercial micrometric scale and may be varied as is usual in such structures. The measuring rod has upon its upper end a measuring head or stop 17 provided with a flat bottom measuring face 18. The rod may be clamped at any point in its longitudinal travel by a clamping screw 19 mounted in a threaded opening 20 in the base, whose inner end 21 abuts against the measuring rod. The lower end face 23 of the measuring rod is normally in the plane of the base surface 2.

The head upon the measuring rod may be made adjustable to compensate for wear. Such a construction is shown in Figs. 5 and 6 wherein the rod 6 is provided with an end thread 30 to engage an internal thread 31 in a nut body 32 whose lower face 33 constitutes a measuring surface. Integral with the upper portion of the nut body 32 is a tapering or conical sleeve or hub 33 within which the thread 31 is continued, and provided with vertical slots 34. The hub portion of the split nut is provided with an external thread 35 which engages the internal thread 36 of the clamping nut 37. It will be noted that by this construction the nut body or head 32 may be adjusted longitudinally of the rod 6, and be then clamped thereto by the nut 37. The length of the measuring rod from its surface 23 to the surface 18 is the length of the base, barrel, and thimble when the thimble scale registers with 0 graduation of the scale 16. In the present instance the sleeve 9 and thimble 12 are fastened together by a screw 39.

My gage is operated as follows. The parts are originally as shown in Fig. 2. The nut 19 is loosened and the surface 2 of the base is placed against the face of the work adjacent the edge of the latter and the rod is manually pushed toward the base 1 until the rod surface 23 reaches the surface to which the measurement is to be taken, whereupon the clamping screw 19 is tightened. Next, the thimble 12 is manually revolved backwardly, moving the thimble toward the head 17, until the face 10 engages the face 18 whereupon the reading of the measured distance is indicated on the scales 15 and 16. In other words the distance between the surfaces 10 and 18 is equal to the length of the scale 16 or the distance between 0 and 5.

In order to set the gage with the rod 6 projected any desired distance, the barrel 12 is advanced until the micrometer reading is the desired amount, then the screw 19 is loosened, and the measuring rod 6 advanced until the surfaces 10 and 18 are in contact. Whereupon screw 19 is retightened and the amount projecting will agree with the reading of the scale.

Other rods may be provided of any predetermined length so as to give multiples of the micrometric reading of the barrel, namely, if it was desired to measure a depth greater than the micrometric reading, longer rods would be provided whose length was increased by units, the length of which would be the length of the micrometric scale. In this way distances greater than the length of the micrometric scale may be measured.

I claim:

1. In a micrometer gage, the combination with the base, of a graduated threaded barrel on the base, a threaded tube engaging the barrel, a graduated thimble fast to the tube, a rod slidably mounted in the base extending through the tube, and a measuring head upon the rod.

2. In a micrometer gage, the combination with the base, of a graduated internally threaded barrel on the base, a tube in the barrel provided with a thread engaging the threaded barrel and provided with a measuring face upon its end, a graduated thimble fast to the tube, a measuring rod slidably mounted in the tube and base and extending beyond the tube, and a head upon the extended portion of the tube provided with a measuring face adapted to coöperate with the first mentioned face.

3. In a micrometer gage, the combination with the base, of a graduated threaded barrel on the base, a threaded tube engaging the barrel, a thimble fast to the tube, a grooveless rod mounted in the base and tube and extending beyond the tube, a measuring head upon the extended portion of the rod in the path of the tube, and a clamping screw in the base engaging the rod.

In testimony whereof I have affixed my signature.

ALFRED H. WHATLEY.

Copies of this patent may be obtained for five cents each, by addressing the "Commissioner of Patents Washington, D. C."